United States Patent [19]
Stove

[11] Patent Number: 5,994,871
[45] Date of Patent: Nov. 30, 1999

[54] CHARGING OF SECONDARY CELLS USING TRANSMITTED MICROWAVE ENERGY

[75] Inventor: Andrew G. Stove, Reigate, United Kingdom

[73] Assignee: U.S. Philips Corporation, New York, N.Y.

[21] Appl. No.: 09/046,032

[22] Filed: Mar. 23, 1998

[30] Foreign Application Priority Data

Mar. 21, 1997 [GB] United Kingdom .................. 9705870

[51] Int. Cl.⁶ ........................ H01M 10/44; H01M 10/46
[52] U.S. Cl. ............................................. 320/101
[58] Field of Search ..................... 320/101, 123, 320/128, 134, 136, FOR 111, FOR 129, FOR 142, FOR 148, FOR 160, DIG. 21; 219/678, 679, 736

[56] References Cited

U.S. PATENT DOCUMENTS

| | | | |
|---|---|---|---|
| 3,852,755 | 12/1974 | Works et al. ........................... | 343/701 |
| 4,685,047 | 8/1987 | Phillips, Sr. ........................... | 363/126 |
| 4,918,749 | 4/1990 | Entschladen et al. .................. | 455/327 |
| 5,107,086 | 4/1992 | Yangas .............................. | 219/10.55 F |
| 5,122,809 | 6/1992 | Haruyama et al. .................... | 343/700 |
| 5,644,207 | 7/1997 | Lew et al. ............................. | 320/101 |
| 5,789,900 | 8/1998 | Hasegawa et al. ................. | 320/134 X |

OTHER PUBLICATIONS

William Brown, IEEE Transactions on Microwave Theory and Techniques, vol. MTT–32, No. 9, Sep. 1984, pp. 1230–1242, "The History of Power Transmission by Radio Waves".

*Primary Examiner*—Edward H. Tso
*Attorney, Agent, or Firm*—Jack D. Slobod

[57] ABSTRACT

A method of charging/recharging a secondary cell (24) by rectifying transmitted microwave energy which may be supplied by an unmodified microwave oven (18) into which oit is placed. The secondary cell (24) or an article, suchas a portable transceiver (10), containing a secondary cell is protected from harmful effects of microwave energy using a Faraday cage (12) and an antenna (16) disposed outside the Faraday cage picks up the energy which is rectified using s Schottky barrier diode (26). Optionally, the secondary cell may be disposed outside the oven (18) and the rectified current is supplied from the interior of the oven by way of conductors and/or a suitable connector.

14 Claims, 2 Drawing Sheets

CHARGING OF SECONDARY CELLS USING TRANSMITTED MICROWAVE ENERGY

BACKGROUND OF THE INVENTION

1. Field of the Invention

The present invention relates to a method of, and apparatus for, charging/recharging secondary cells using transmitted microwave energy.

2. Description of the Related Art

The concept of generating dc power from transmitted radio waves is known from IEEE Transactions on Microwave Theory and Techniques, Vol. MTT-32, No. Sep. 9, 1984 pages 1230 to 1242 "The History of Power Transmission by Radio Waves" by William C. Brown. The article reports that recovering dc power using a half-wave rectifier is an effective, relatively expensive and simple alternative compared to using a full wave rectifier. The rectifiers may be gallium arsenide Schottky—barrier diodes otherwise known as IMPATT devices.

U.S. Pat. No. 5,122,809 discloses a device for generating dc power directly from microwave energy. The device comprises a microstrip resonator having a line length of half a wavelength at the desired frequency. The resonator is split at its centre into 2 separate, aligned portions. A Schottky rectifier interconnects the adjacent ends of the separate portions of the resonator. No practical application is disclosed for the dc power generated.

Charging and/or recharging secondary cells normally requires connecting the cell(s) to a dedicated battery charger which a user does not carry with them. Additionally fast charging of cells normally takes at least 30 to 60 minutes which is not convenient in situations such as patrolling policemen where there is a requirement to be capable of maintaining radio contact whilst out on patrol. Accordingly there is a need to be able to recharge secondary cells very rapidly without requiring a dedicated battery charger.

SUMMARY OF THE INVENTION

According to one aspect of the present invention there is provided a method of charging a secondary cell in which the charging current is derived from transmitted microwave energy.

According to another aspect of the present invention there is provided an apparatus for charging a secondary cell, comprising a source of microwave energy having a chamber and means in the chamber for detecting and rectifying microwave energy emitted by said source and for conducting the rectified energy to a secondary cell.

The source of transmitted microwave energy may be a microwave oven operating at a frequency greater than 2 GHz, for example between 2.4 and 2.5 GHz. The detected microwave energy may be rectified and the nominally dc current conducted to the outside of the microwave oven. Alternatively the secondary cell and/or article containing the secondary cell may be placed in the oven chamber. In the latter event, the secondary cell and or article may be protected from the harmful effects of the microwave energy, which effects may result in lossy materials being heated excessively leading to electrical and/or structural damage. Using a Faraday cage is one method by which the secondary cell(s) or article may be protected. The Faraday cage may be formed integrally with the housing of the secondary cell(s) or article or may be separate from and enclose the cell(s) or article.

In order to illustrate the fast recharging achieved by the method in accordance with the present invention, consider for example a typical rechargeable battery having a capacity of substantially 1 amp—hour at 6 V, or substantially 22 kJ. A microwave oven which radiates 700 W will supply this amount of energy in 30 seconds if the charging process is 100% efficient and 5 minutes if the charging process is 10% efficient. Rechargeable cells which can be recharged as quick as this can now be produced.

BRIEF DESCRIPTION OF THE DRAWING

The present invention will now be described, by way of example, with reference to the accompanying drawings, wherein.

In the drawings, the same reference numerals have been used to indicate corresponding features.

DETAILED DESCRIPTION OF THE PREFERRED EMBODIMENTS

Figure 1:
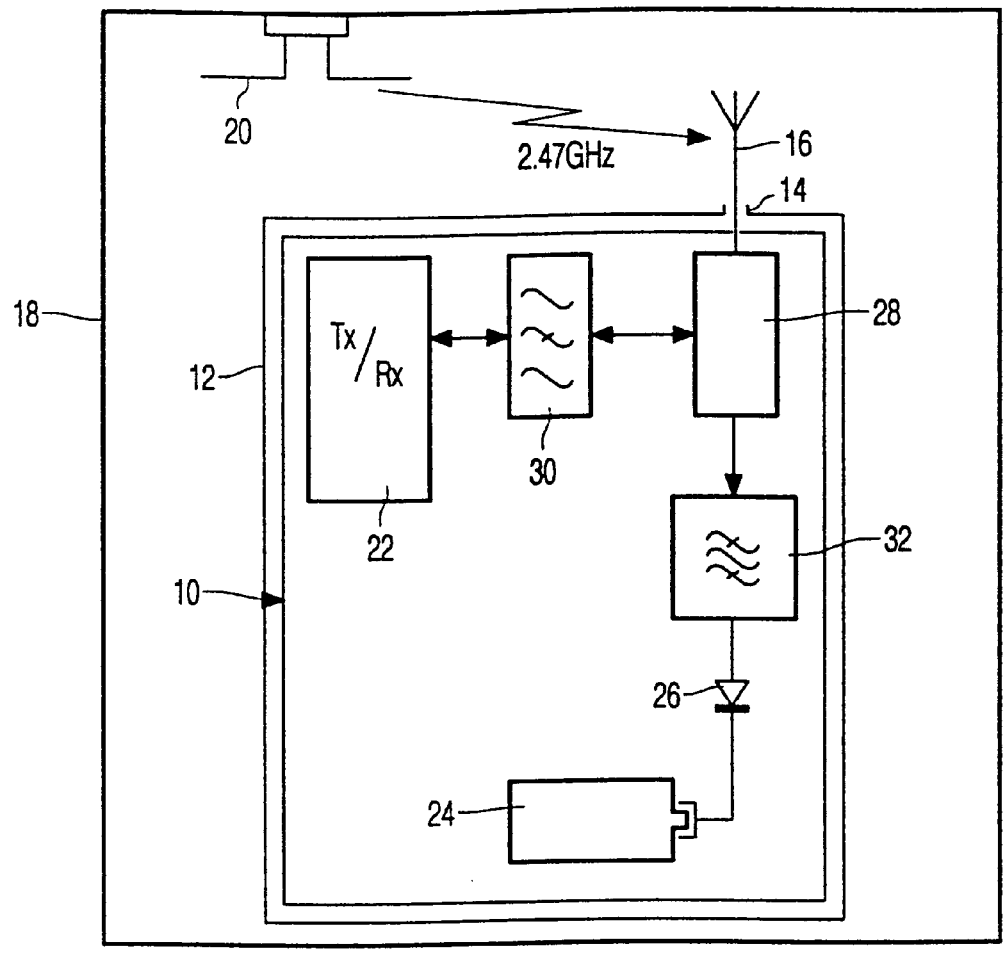
FIG. 1 is a diagram illustrating a cellular or cordless telephone enclosed in a Faraday cage and placed in a microwave oven.

FIG. 1 shows a cellular telephone 10 mounted in a Faraday cage 12 which has an opening 14 through which the antenna 16 of the cellular telephone protrudes. The Faraday cage 12 together with the cellular telephone 10 is placed in an unmodified microwave oven 18 having an antenna 20 which radiates microwave energy having a frequency of greater than 2.0 GHz, typically at an approved frequency such as 2.47 GHz in the band between 2.4 and 2.5 GHz.

The cellular telephone 10 includes a transceiver 22 and associated circuitry and is powered by a secondary cell 24, for example a Ni—Cd cell. The secondary cell 24 is rechargeable using the transmitted microwave energy from the antenna 20 which is picked-up by the antenna 16 and conducted to a half—wave rectifier 26, for example a gallium arsenide Schottky—barrier diode. The output from the rectifier 26 is supplied to the secondary cell 24.

In order to prevent microwave energy from reaching the transceiver 22 and transmitted signals from the transceiver being used for charging the cell 24, a high quality diplexer 28 is coupled to the antenna 16. A band stop filter 30 is coupled between a first port of the diplexer 28 and the transceiver 22 and a band pass filter 32, centred on the frequency of the microwave energy (for example 2.47 GHz), is coupled between a second port of the diplexer 28 and the rectifier 26.

If desired the Faraday cage 12 may be integrated with the housing of the cellular telephone 10 so that the entire self contained unit can be placed in the microwave oven.

Figure 2:
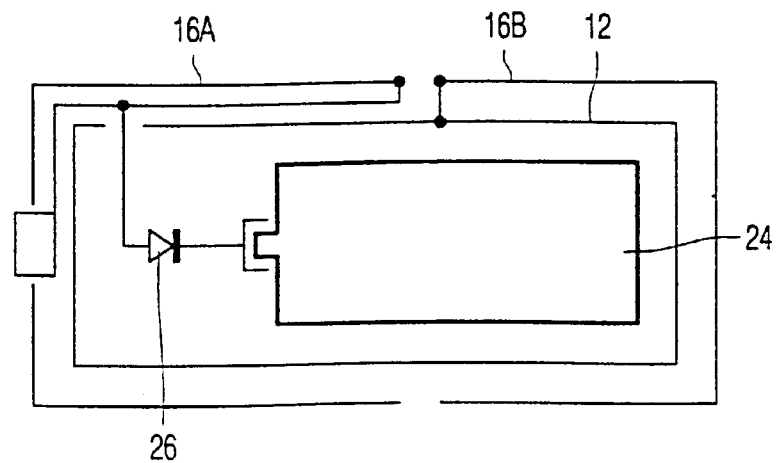
FIG. 2 is a diagram illustrating a secondary cell and battery charging rectifier built into a Faraday cage having a microwave antenna on the exterior of the Faraday cage.

FIG. 2 illustrates an embodiment of a secondary cell 24 which is enclosed in a Faraday cage 12. A rectifier 26 is disposed within the Faraday cage 12 and has its cathode connected to a positive terminal of the cell. The anode of the rectifier 26 is coupled to a first portion 16A of a microstrip antenna 16, a second portion of which is connected to the Faraday cage 12.

The arrangement shown in FIG. 2 comprises an integral, self-contained battery unit which can simply be detached from its user apparatus, placed in a microwave oven, irradiated with microwave energy to recharge the secondary cell, and refitted to the user apparatus.

Figure 3:
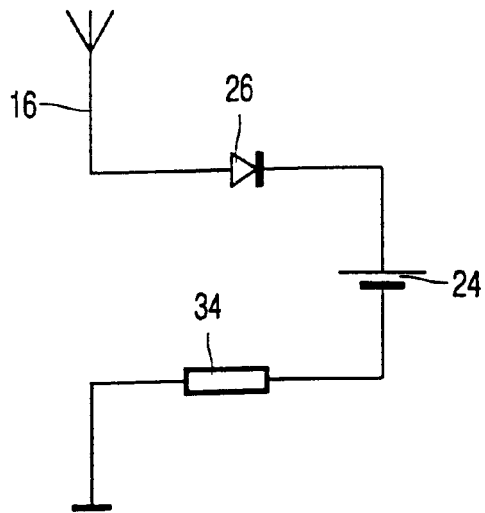
FIG. 3 is a schematic circuit diagram of a charging circuit having overcharging protection.

FIG. 3 shows an arrangement for protecting the secondary cell 24 from being charged too quickly and/or being overcharged. A positive temperature coefficient (PTC) thermistor 34 is connected in series with the secondary cell 24 and is thermally coupled to the cell 24 in order to sense its increase in temperature as the cell charges up. As the temperature in the secondary cell 24 increases, the resistance of the thermistor increases thus reducing the current flow.

Figure 4:
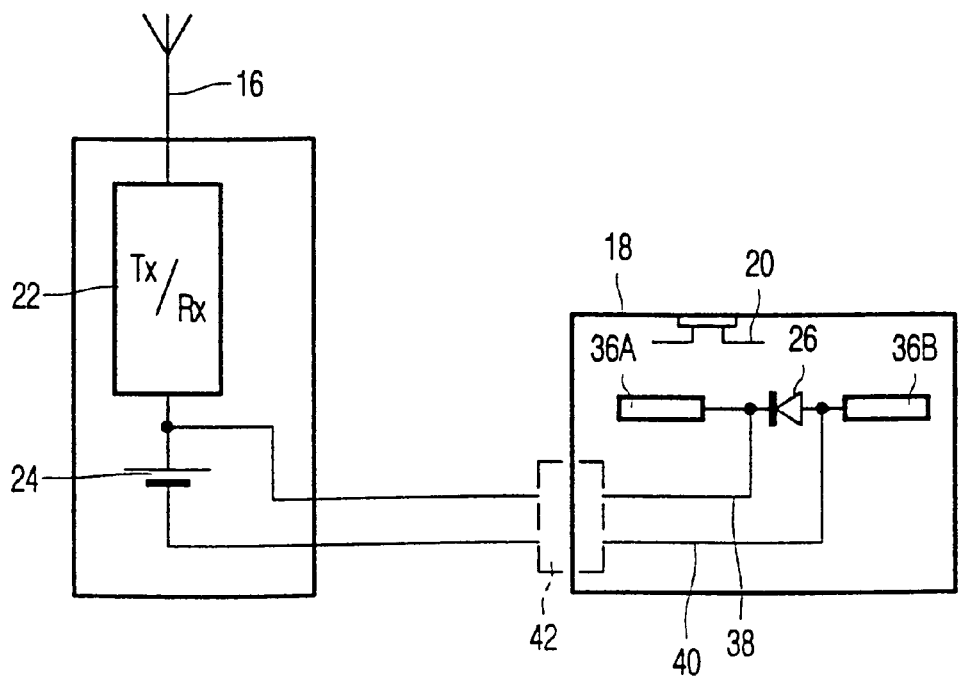
FIG. 4 is a diagram showing an arrangement in which transmitted microwave energy is rectified inside a microwave oven and the rectified current is used to charge/recharge a secondary cell located outside the oven.

FIG. 4 illustrates a variant of the arrangement shown in FIG. 1 in which a microstrip resonator 36 having a line length of half a wavelength of the centre frequency to be received is split into two equal length portions 36A and 36B which are electrically interconnected at their adjacent ends by a Schottky-barrier diode. The rectified current generated is conducted by electrical conductors 38, 40 outside the microwave oven 18 where it is used to charge/recharge the secondary cell 24 which may be mounted in situ in a transceiver housing. If desired a connector 42 may be provided in a wall of the oven 18.

Although the present invention has been described in respect of secondary cells used in telecommunications apparatus it may be applied to an other apparatus which may be adapted to receive transmitted microwave radiation.

From reading the present disclosure, other modifications will be apparent to persons skilled in the art. Such modifications may involve other features which are already known in the design, manufacture and use of battery charging systems and component parts thereof and which may be used instead of or in addition to features already described herein.

I claim:

1. A method of charging/recharging a secondary cell comprising:

placing the secondary cell in a microwave oven;

generating radiated microwave energy in the microwave oven;

protecting at least the secondary cell from harmful effects of the radiated microwave energy;

receiving and rectifying the radiated microwave energy to form a dc current; and supplying the dc current to the secondary cell.

2. A method as claimed in claim 1, wherein said protecting at least the secondary cell from harmful effects of microwave radiation is while the secondary cell is being charged/recharged.

3. A method as claimed in claim 2, further comprising protecting the secondary cell from being overcharged by sensing the temperature of the secondary cell and reducing a flow of the dc current into the secondary cell as the sensed temperature increases.

4. A method as claimed in claim 1, wherein said protecting at least the secondary cell from harmful effects of the radiated microwave energy is accomplished by containing at least said secondary cell in a Faraday cage, said receiving the radiated microwave energy is via an antenna exposed to the exterior of the Faraday cage, and said rectifying is with rectifying means which is coupled between the antenna and the secondary cell.

5. A method as claimed in claim 4, further comprising protecting the secondary cell from being overcharged by sensing the temperature of the secondary cell and reducing a flow of the dc current into the secondary cell as the sensed temperature increases.

6. A method as claimed in claim 1, further comprising protecting the secondary cell from being overcharged by sensing the temperature of the secondary cell and reducing a flow of the dc current into the secondary cell as the sensed temperature increases.

7. An apparatus for charging/recharging a secondary cell comprising:

a source of radiated microwave energy;

receiving means for receiving the radiated microwave energy;

rectifying means coupled to the receiving means for rectifying the received microwave energy to form a dc current; and a coupling for supplying the dc current from the rectifying means to the secondary cell, wherein the receiving means comprises an antenna coupled to a transceiver and further comprising a diplexer coupled to the antenna, the diplexer having first and second ports, a band stop filter coupling the first port to the transceiver for blocking the received microwave energy and a band pass filter for passing the received microwave energy to the rectifying means.

8. An apparatus as claimed in claim 7, wherein the source of microwave energy includes a chamber having means to radiate the microwave energy, and wherein protection means are provided for Protecting the secondary cell or an article containing the secondary cell from harmful effects of microwave radiation while being charged/recharged in said chamber.

9. An apparatus as claimed in claim 8, wherein the protection means comprises a Faraday cage.

10. An apparatus as claimed in claim 7, further comprising overcharging protection means for the secondary cell.

11. An apparatus as claimed in claim 7, further comprising an overcharging protection circuit including a thermistor mounted in close proximity to the secondary cell and electrically connected in series with the secondary cell.

12. An apparatus as claimed in claim 7, further comprising a housing containing the transceiver, the diplexer, the band stop and bandpass filters, the rectifying means, and the secondary cell, said housing comprising means for protecting the interior of the housing from harmful effects of the radiated microwave energy.

13. A method of charging/recharging a secondary cell comprising:

generating radiated microwave energy;

receiving and rectifying the radiated microwave energy to form a dc current; and supplying the dc current to the secondary cell;

wherein the generated microwave radiation and said receiving and rectifying are inside a microwave oven, said secondary cell is outside the microwave oven, and said supplying is by conducting the dc current out of the microwave oven and to the secondary cell.

14. A method as claimed in claim 13, further comprising protecting the secondary cell from being overcharged by sensing the temperature of the secondary cell and reducing a flow of the dc current into the secondary cell as the sensed temperature increases.

* * * * *